J. R. BACK.
SPINDLE AND GEAR BEARING FOR LATHES.
APPLICATION FILED FEB. 10, 1913.
1,103,645.
Patented July 14, 1914.
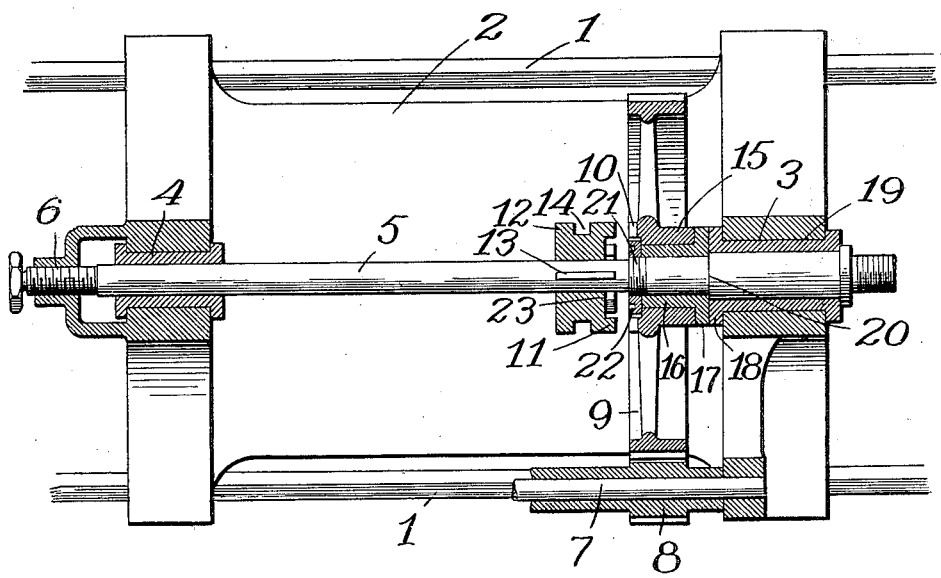
Witnesses
R. D. Tolman
Penelope Comberbach
Inventor
John R. Back
By Ralph E. Atherton
Attorney

UNITED STATES PATENT OFFICE.

JOHN R. BACK, OF WORCESTER, MASSACHUSETTS.

SPINDLE AND GEAR BEARING FOR LATHES.

1,103,645.   Specification of Letters Patent.   Patented July 14, 1914.

Application filed February 10, 1913. Serial No. 747,303.

*To all whom it may concern:*

Be it known that I, JOHN R. BACK, a citizen of the United States, residing at Worcester, in the county of Worcester and Commonwealth of Massachusetts, have invented a new and useful Improvement in Spindle and Gear Bearings for Lathes, of which the following is a specification, accompanied by a drawing forming a part of the same.

My present invention relates to that part of a lathe which comprises the live spindle and the driving mechanism therefor, and it has for its object to reduce the wear of the moving parts, simplify the construction, and increase the efficiency of this class of machines through greater accuracy of operation; and these objects, among others, I accomplish by the construction and arrangement of parts as hereinafter described, the novel features being pointed out in the annexed claims.

Referring to the accompanying drawing which represents a plan view of a lathe head shown in section, on the plane of the live spindle, 1, 1, denote the ways of the lathe, upon which the head 2 is mounted. Journaled in bearings 3, 4 of the head is the live spindle 5 of the lathe, said live spindle provided at its right hand end, in the figure, with the usual face plate and center, not shown, and abutting at its other end against an adjustable screw 6, adapted to receive the thrust upon the spindle in the operation of the machine.

Journaled at one side of the live spindle 5 is a countershaft 7, carrying a pinion 8 by which rotary motion is imparted to a spur gear 9 having clutch teeth 10 adapted to be engaged by the teeth 11 of a sliding clutch collar 12, connected to the live spindle 5 by a spline 13 and arranged to be thrust into and out of engagement with the clutch teeth 10 by a suitable shipping mechanism, not shown, engaging an annular groove 14. Instead of mounting the spur gear 9 directly upon the live spindle 5, adjacent the front bearing 3, as is usual in the construction of lathes of this character, a bushing 16, of the particular construction hereinafter described, is interposed between the spur gear and the live spindle. To this end, the live spindle 5 is reduced in section behind the portion contained within a bushing 19 of the front bearing 3 when the spindle is in position, to form a shoulder 20 in alinement with the inner end of the bushing 19. The bushing 16, which has at its end an annular flange 17, is mounted on said reduced portion of the spindle, with the flange 17 abutting the bushing 19 and the shoulder 20. The hub 15 of the spur gear 9 is journaled upon the bushing, abutting the inner face of flange 17, and is held thereon by a nut 22, engaging screw threads 21 on the spindle, said nut having a face overlapping the inner face of the hub 15, and also serving to hold the bushing 16 against the bushing 19 and shoulder 20, restraining said bushing from endwise movement on the spindle.

When the clutch collar 12 is carried into engagement with the spur gear, the nut 22 is received in a recess 23 in the side of the clutch collar 12. Any wear incident to the rotation of the spur gear 9 when disengaged from the live spindle 5 comes only upon the bushing 16 and does not affect any of the parts which control the longitudinal position of the live spindle, and any wear occurring between the bushing 16 and the bushing 19 incident to the rotation of the live spindle 5 through the clutch collar 12 can be taken up by the nut 22. Extreme accuracy in the operation of the machine is thereby secured and the live spindle is relieved from the wear of rotating parts.

I claim,

1. A fixed framework, a shaft journaled in said framework slightly reduced in diameter next one of its bearings forming a shoulder, a gear wheel bushing on said reduced section adapted to bear against said bearing, said shaft being provided with a screw-thread and a nut by which said bushing is held against said shoulder, a gear wheel rotatable on said bushing, a driving pinion engaging said gear wheel, and a clutching mechanism between said shaft and said gear wheel.

2. A fixed framework, a shaft journaled in said framework, said shaft having a slightly reduced section next one of its bearings, a gear wheel bushing held on said reduced section, and provided at its end next said bearing with a radial flange, a gear wheel turning loosely on said bushing, a nut held on said shaft and bearing against said bushing to hold it against said shoulder, said nut overlapping said gear wheel, means for rotating said gear wheel, and a clutching mechanism for connecting said gear wheel and said shaft.

3. A fixed framework, a shaft journaled in said framework, a gear wheel carried on said shaft adjacent to one of its bearings, means for rotating said gear wheel, a clutching mechanism between said gear wheel and said shaft, a bushing between said gear wheel and said shaft provided at one end with a radial flange between said gear wheel and the journal bearing of said shaft, a shoulder on said shaft, a nut engaging a screwthreaded section of said shaft, and overlapping said bushing, and said gear wheel, and means at the end of said shaft for receiving the end thrust upon the shaft.

4. The combination, with a rotatably journaled shaft having means for preventing endwise movement in one direction, of a bushing held on said shaft against one of its bearings to prevent endwise movement of said shaft in the other direction, a rotating wheel journaled on said bushing, and means for rotatably connecting said wheel to said shaft.

5. The combination with a rotatably journaled shaft having a shoulder formed adjacent one of its bearings, a bushing carried by said shaft, a rotating wheel journaled on said bushing, means for holding said bushing in abutting engagement with said shoulder and said bearing, whereby to prevent endwise movement of the shaft in one direction, said means also adapted to retain said wheel on said bushing, means for preventing endwise movement of said shaft in the other direction, and means for rotatably connecting said wheel to said shaft.

6. The combination with a shaft rotatably mounted in a fixed framework and having a thrust bearing at one end, of a bushing journaled on said shaft and held from endwise movement thereon, said bushing adapted to bear against a portion of the framework to provide an opposite thrust bearing for said shaft, a rotating wheel journaled on said bushing, and means for rotatably connecting said wheel to said shaft.

7. In a device of the class described, a spindle shaft, a bearing therefor, a sleeve on said shaft adjacent to said bearing, a gear normally free to rotate upon said sleeve, means for operatively connecting said gear with said shaft and means for preventing longitudinal movement of said gear relative to said shaft comprising, a collar upon said shaft on the opposite side of the bearing from said gear, and a second collar on said shaft on the opposite side of the gear from the bearing, one of said collars being longitudinally adjustable upon said shaft.

8. In a device of the class described, a spindle shaft, a bearing therefor, a sleeve on said shaft but longitudinally movable thereon, an annular flange upon said sleeve, a gear loosely mounted upon said sleeve, means for operatively connecting said gear with said shaft and means for preventing longitudinal movement of said shaft within said bearing and of said gear relative to said shaft comprising, a collar upon said shaft on the opposite side of the bearing from said gear, and a second collar on said shaft on the opposite side of said gear from said bearing adapted to hold said sleeve in contact with the opposing face of said bearing and said gear in contact with the annular flange on said sleeve, one of said collars being longitudinally adjustable upon said shaft.

JOHN R. BACK.

Witnesses:
PENELOPE COMBERBACH,
NELLIE WHALEN.

Copies of this patent may be obtained for five cents each, by addressing the "Commissioner of Patents, Washington, D. C."